United States Patent
Burmeister et al.

(10) Patent No.: US 9,908,244 B2
(45) Date of Patent: Mar. 6, 2018

(54) WARNING METHOD AND ROBOT SYSTEM

(71) Applicant: Siemens Aktiengesellschaft, Munich (DE)

(72) Inventors: Soeren Burmeister, Fuerth (DE); Marc Holz, Erlangen (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 15/322,364

(22) PCT Filed: Jul. 2, 2014

(86) PCT No.: PCT/EP2014/064079
§ 371 (c)(1),
(2) Date: Dec. 27, 2016

(87) PCT Pub. No.: WO2016/000770
PCT Pub. Date: Jan. 7, 2016

(65) Prior Publication Data
US 2017/0120460 A1    May 4, 2017

(51) Int. Cl.
| | |
|---|---|
| *B25J 19/06* | (2006.01) |
| *B25J 9/16* | (2006.01) |
| *G08B 21/02* | (2006.01) |
| *G08B 31/00* | (2006.01) |
| *G08B 7/06* | (2006.01) |

(52) U.S. Cl.
CPC .......... *B25J 19/06* (2013.01); *B25J 9/1676* (2013.01); *B25J 19/061* (2013.01); *G08B 7/06* (2013.01); *G08B 21/02* (2013.01); *G08B 31/00* (2013.01); *G05B 2219/40196* (2013.01)

(58) Field of Classification Search
CPC ........ B25J 19/06; B25J 9/1676; B25J 19/061; G08B 21/02; G08B 7/06; G08B 31/00; G05B 2219/40196
USPC ................................................. 700/245, 248
See application file for complete search history.

(56) References Cited

U.S. PATENT DOCUMENTS

| | | | | |
|---|---|---|---|---|
| 4,661,797 | A * | 4/1987 | Schmall ................... | B23Q 5/58 324/661 |
| 9,043,025 | B2 * | 5/2015 | Brooks .................. | B25J 9/1676 700/245 |
| 2006/0108960 | A1 * | 5/2006 | Tanaka ................... | B25J 9/1676 318/568.21 |

(Continued)

FOREIGN PATENT DOCUMENTS

| | | |
|---|---|---|
| JP | H05-229784 A | 9/1993 |
| JP | 2006/285635 A | 10/2006 |

(Continued)

*Primary Examiner* — Jaime Figueroa
(74) *Attorney, Agent, or Firm* — Cozen O'Connor

(57) ABSTRACT

A method for warning a person in a working area about at least one first robot, and a robot system that includes the at least one first robot, wherein the movement of the robot in a future working interval is predicted, a determination is made as to whether a working area segment will be passed over by the robot in a first or second time period, a first or second visual warning is emitted in accordance with when the working area segment will be passed over, and the first or second visual warnings are respectively emitted onto a floor segment that is assigned to a respective working area segment.

18 Claims, 4 Drawing Sheets

(56) References Cited

U.S. PATENT DOCUMENTS

| | | | |
|---|---|---|---|
| 2009/0030549 A1* | 1/2009 | Sakai | B25J 9/1676 700/245 |
| 2009/0171505 A1* | 7/2009 | Okazaki | B25J 9/1676 700/258 |
| 2011/0050878 A1* | 3/2011 | Wells | H04N 7/181 348/86 |
| 2012/0029700 A1* | 2/2012 | Eickhorst | B25J 9/1676 700/264 |
| 2012/0163953 A1* | 6/2012 | Murano | B25J 9/0093 414/788.1 |
| 2012/0182155 A1 | 7/2012 | Sato et al. | |
| 2013/0201292 A1 | 8/2013 | Walter et al. | |
| 2014/0067121 A1 | 3/2014 | Brooks et al. | |
| 2015/0294496 A1* | 10/2015 | Medasani | H04N 7/181 348/159 |
| 2015/0298318 A1* | 10/2015 | Wang | B25J 9/1676 700/257 |
| 2016/0059416 A1* | 3/2016 | Tian | B25J 9/1666 700/253 |
| 2016/0129595 A1* | 5/2016 | Gerio | B25J 9/1676 700/255 |

FOREIGN PATENT DOCUMENTS

| | | |
|---|---|---|
| WO | WO 2009/063318 A1 | 5/2009 |
| WO | WO 2011/128117 A2 | 10/2011 |
| WO | WO 2014/036549 A2 | 3/2014 |

* cited by examiner

WARNING METHOD AND ROBOT SYSTEM

CROSS-REFERENCE TO RELATED APPLICATIONS

This is a U.S. national stage of application No. PCT/EP2014/064079 filed 2 Jul. 2014.

BACKGROUND OF THE INVENTION

1. Field of the Invention

The invention relates to a robot system and method for warning a person who is present in the region of the robot system while it is operating. In addition, the invention relates to a computer program which is suitable for operating the robot system in the sense of the inventive warning method.

2. Description of the Related Art

JP 2006/285635 A discloses an autonomous robot that is in a position to move itself along a path and in doing so to indicate to persons in the environment a section of the path traveled. For this purpose, lighting facilities are attached to the upper surface of the floor, these being coupled to receivers. The autonomous robot has a lighting controller that switches on the lighting facilities located in the floor, and thereby illuminates a section of the path traveled by the robot. Here, the lighting facilities arranged on the floor essentially form a chain.

WO 2009/0633181 A1 discloses a mobile robot that is designed to indicate, via lighting devices, danger areas that surround the robot. For this purpose, the robot is provided with projectors that are affixed to the robot's housing. The robot is designed to determine the outline of a danger area and via the projectors to create a correspondingly shaped projection on the floor. Here, a movement of the robot itself and a movement of a part of the robot, such as a robot arm, can be taken into account.

WO 2014/036549 A2 discloses a robot that is provided with a sensor system for detecting persons in a detection region around the robot. In addition, the robot incorporates a computational unit, which is designed to define a danger zone that at least partially overlaps the detection region. In addition, the robot is provided with an image recognition device, by which human body parts, such as a torso, head or arms, can be recognized. Depending on the body part of a human detected in the danger zone by the robot, various safety measures are initiated, such as a reduction in the travel speed of the robot.

JP 05-229784 discloses a warning system that comprises a colored laser source, which is designed to form a laser beam film on a surface. Here, the warning system in accordance with JP 05-229784 is affixed to a crane that moves a transport item on its crane hook. The laser warning system is affixed to the crane such that the danger area underneath the transport item is visibly marked.

A significant disadvantage of the conventional warning systems consists in the fact that, during operation, close approaches frequently arise between robots and persons, in which accidents can only be avoided by the intervention of safety mechanisms of the robot. In this situation, the robot comes to a standstill, so that a delay occurs in the current work process.

SUMMARY OF THE INVENTION

It is an object of the present invention to provide a robot system and an associated warning method which overcomes the disadvantages of the prior art.

This and other objects and advantages are achieved in accordance with the invention by a method that is used to warn a person about at least one first robot that is located in a working space. The working space is subdivided into a plurality of working space segments, where a floor segment is assigned to a working space segment. In the inventive method, a first step is performed, in which a robot movement of the at least one robot is predicted. Here, the prediction can be effected via a time-shifted simulation or a code analysis of a control program of the at least one robot. In the first step, the robot movement is predicted here for a working interval. The working interval is a selectable period of time that extends by a selectable duration into the future. In a second method step, a determination is made of the space through which the at least one robot passes during the working interval in the course of the robot movement. Here, the space passed through, which is determined in the second step, comprises an area that is passed through by the main body of the robot, a robot arm and/or a manipulator affixed to the robot.

In a third method step, at least one working space segment that resides at least partially in the space passed through by the robot is determined. In so doing, it is also determined in each case whether this passing through occurs in a first and/or a second time period. The working interval in which the predicted robot movement occurs comprises the first and second time period. The first time period is preferably a time interval from 0 to 10 seconds in the future, the second time period preferably a time period from 10 to 20 seconds in the future. The third method step permits a prediction of when there will be a dangerous situation for an operator, and in which working space segments, while a program is being executed in accordance with the requirements in a working interval of the at least one first robot. If it is determined, based on the above-cited method steps, that the robot will pass through a working space segment within the first time period, then a first visual warning will be output upon the floor segment that is assigned to the working space segment concerned. If it is determined, based on the method steps cited above, that the robot will pass through a working space segment within the second time period, then a second visual warning will be output upon its assigned floor segment.

In making the prediction of the robot movement, the method in accordance with the invention may rely on a time-shifted simulation or a code analysis of the programming of the robot. A time-shifted simulation or a code analysis of a robot's programming can be rapidly and reliably performed in a technically simple manner with low requirements for computational capacity. In so doing, it is possible to rapidly convert unpredictable external events, such as a halt or delay of the robot that has occurred in the meantime, into an updated output of visual warnings. A robot's programming essentially comprises the sequential working through of movement commands, whereby the predictability of a robot's movement is further simplified.

The method in accordance with the invention permits a differentiated image of a potential future danger situation to be determined in a meaningful way. This makes it simpler for the robot movement which is to be performed to be anticipated by persons, who can then adjust their behavior accordingly. With this, it is possible to simply prevent a close approach of a person to the at least one first robot, so that delays in the operational sequence of the at least one first robot are minimized.

In a preferred embodiment of the inventive method, account is taken not only of the at least one first robot but also of a first transport item that is being moved by the at least one first robot. By this, a space is detected that is passed through jointly by at least one first robot and the first transport item. It is hereby possible, via the method in accordance with the invention, to more precisely determine the space traveled through in which there is a dangerous situation for a person. The disclosed method in accordance with the invention is thereby more differentiated in the determination of an existing situation and permits a more informative warning behavior with respect to a person, whereby the safety prevailing in the working space is improved.

In a further preferred embodiment of the method, the first and the second visual warning are each from colored signals or light patterns. In so doing, the first and second visual warnings can, for example, be formed as constant or periodic light signals in different colors. It is equally possible that each of the first and second visual warnings forms geometric shapes, which are formed on the relevant floor segment, such as a pattern of points, geometric figures or symbols. In this case, the light patterns can be constant over time or changeable. The term changeable light pattern is to be understood, for example, as an animation. With this, the method in accordance with the invention can output a further differentiated warning to a person, which because of its obvious meaningfulness supplies in a simple way a precise image about a potential danger situation.

Over and above this, the method in accordance with the invention can additionally determine in addition whether there is, in at least one third time period, a working space segment that resides at least partially within the space traveled through. If it is determined that, within the at least one third time period, a working space is traveled through, a third visual warning is output on an associated floor segment. A warning method with consideration of a third time period that outputs a third visual warning permits a more differentiated determination and representation of the scope of the potential danger in a prevailing situation. With this, the prevailing safety is further increased.

In a preferred embodiment of the method, it is possible, in a method step in which a first, second or third visual warning is output, to trigger in addition an acoustic warning. The triggering of an acoustic warning makes it possible to warn of situations with a high potential danger. It is thus possible, for example, if there are in the working space exclusively working space segments that are traveled through by the at least one first robot in the first time interval, to warn of them via a warning tone. With this, it is possible to avoid operating situations in which safety mechanisms of the at least one first robot intervene, and must give rise to a delay. This is particularly advantageous in the case of work sequences in which robots are used with a high travel speed.

In a further especially preferred embodiment, the visual warnings and/or the acoustic warning are formed in addition as a function of at least one process parameter of the at least one robot. In so doing, a visual or acoustic warning is adapted with the intention that the warning is formed in accordance with the intensity of the prevailing danger situation. For example, if a high potential danger is present, a changed tone of color can be selected, a visual warning can switch over from a constant to a periodic light signal, or an all-over visual warning to a light pattern. In this case, a travel speed of the at least one robot can be the process parameter, as a function of which the visual warnings and/or the acoustic warning is/are adapted. When the robot's travel speed during the working interval is high, there is a greater potential danger than when the travel speed is low. Over and above this, it is also possible to apply, as the process parameter, qualitative information about the first transport item. Here, the qualitative information of the first transport item reflects whether, because of the physical or chemical properties of the first transport item, an increased danger can arise from it for a person. Transport items whose qualitative information can lead to a more intense or clearer warning, in the sense of the inventive method, could be, for example, containers with chemicals or molten material, pointed objects, items made of hard material, or items made of materials that are hard to perceive visually, such as glass or PMMA. Further, as process parameters, use can be made of information relating to the nature and/or scope of the safety measures of the at least one robot that would be triggered if the safety mechanisms of the at least one robot intervene. For example, if the intervention of the safety mechanisms leads to a standstill of a complete production line, the first and/or the second visual warning or an acoustic warning will be output with an increased intensity. If the intervention of the safety mechanisms leads to a delay with no further consequences, the first and/or the second visual warning or the acoustic warning will be output with a reduced intensity.

In one particularly preferred embodiment, a further step determines whether a working space segment will not be traveled through by at least one first robot during the working interval. In this case, a visual all-clear signal will be output in the associated floor segment, signaling to a person that during the working interval there will be no danger situations present in the working space segment concerned. This communicates to the person in the working space in a meaningful manner which regions of the working space can be accessed without further consideration, without the need to allow for a standstill or delay of the at least one first robot. With this, the efficiency of the inventive method is further improved.

Further, the inventive method can be developed such that the method steps, in which a robot movement in a working interval is predicted, the space traveled through during the working interval is determined, and it is determined whether a working space segment lies at least partially in the space traveled through in a first and a second time period, is also performed for at least one second robot. Here, a robot movement of the second robot is predicted separately in a working interval, and the space traveled through by the second robot is determined. It is also separately determined whether a working space segment lies at least in the space traveled through within the first and second time period. Here, the steps to predict the robot movement, to determine the space traveled through, and to determine the working space segments that reside at least partially in the space traveled through, are performed simultaneously with the corresponding method steps with respect to the at least one first robot. The working interval considered is identical in each case for the first and the second robot, as are the first and second time periods for each of which it is detected whether at least one working space segment lies at least partially in the space traveled through. With this, any potential danger that is present is detected in a cohesive manner for a working space with a plurality of robots and is displayed as part of a coherent warning image, which comprises a plurality of first and second visual warnings. This enables a person who is present in a region with a plurality of robots to assess a complex situation that exists in a rapid and simple manner, and thus to avoid danger situations in which safety mechanisms of at least one robot intervene, and can thereby avoid delays in the working sequence. The method in accordance with the invention improves the safety in a working space, and at the same time raises the productivity that can be achieved by the robots located within the space.

It is also an object of the invention to provide a robot system that comprises a controller including a processor and at least one first robot, which is arranged in a working space and is linked to the controller. Here, a link between the at least one first robot and the controller can be any form of data link, via which signals can be exchanged between the at least one first robot and the controller. Here, the working space in which the at least one first robot is arranged comprises a plurality of working space segments that subdivide the working space into appropriately many regions. Here, each working space segment comprises a floor segment, the contours of which correspond to the shape of the working space segment. The robot system in accordance with the invention additionally comprises at least one lighting element, which is linked to the controller. The link between the at least one lighting element and the controller can be any form of link which permits the communication of a control command from the controller to the at least one lighting element. In particular, the link can be constructed as a data cable or a radio link. The at least one lighting element is configured to output a visual warning onto at least one floor segment in each case. The controller of the robot system in accordance with the invention is, furthermore, in a position to perform a method, which comprises the features of the inventive warning method, for warning a person about the at least one first robot. The robot system in accordance with the invention permits a complex work sequence to be performed at increased speed in a working space, whereby a high level of safety is provided for persons who are present and move in the working space. At the same time, a high level of productivity is provided in that standstill periods and delays of the at least one first robot are minimized.

In one preferred form of embodiment of the robot system, at least one second robot is provided. Such a form of embodiment allows placement of a plurality of robots in a small space, which can be operated at high speed and are in a position to implement even complex production sequences. The complex dangerous situation that then arises due to the interaction of the at least two robots can be simply recognized by a person, so that a close and safe network of humans and robots is possible. The disclosed embodiments of the invention allow the productivity that can be achieved with a robot system to be further raised. In a preferred embodiment of the invention, the at least one lighting element can be formed as a plurality of light segments, which can be mounted in various shapes and arrangements. A light segment is assigned to a particular floor segment, and is configured in each case to output a visual warning on the associated floor segment. Here, a light segment can be affixed either directly onto the associated floor segment or above the associated floor segment. A particularly preferred embodiment comprises a lighting element that is affixed to the ceiling. In an alternative embodiment, the at least one lighting element is constructed as a controllable image projector, which is affixed above the associated floor segments. A controllable image projector allows a visual warning to be directed onto a plurality of floor segments using a small number of system components. With this, the complexity of the system is reduced, and the reliability of the robot system is further raised. Over and above this, with a controllable image projector it is possible to change its programming in a simple way, so that visual warnings can easily be adapted to different application purposes. Further, with a controllable image projector it is possible to project a constant or time-varying light pattern onto a floor segment. The inventive robot system can thereby be rapidly and efficiently adapted to a plurality of configurations in the working space, and a plurality of meaningful visual warnings can be generated.

It is also an object of the invention to provide a computer program which is stored on a data storage medium and is suitable for implementing a warning method in accordance with the invention in a robot system in accordance with the invention. Here, the computer program is preferably stored in a memory of the controller of the robot system, which captures the data from the at least one robot and undertakes the actuation of the at least one lighting element.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

Further forms of embodiment and advantages of the invention are reproduced below in FIGS. 1 to 5, in which.

DETAILED DESCRIPTION OF THE EXEMPLARY EMBODIMENTS

Figure 1:
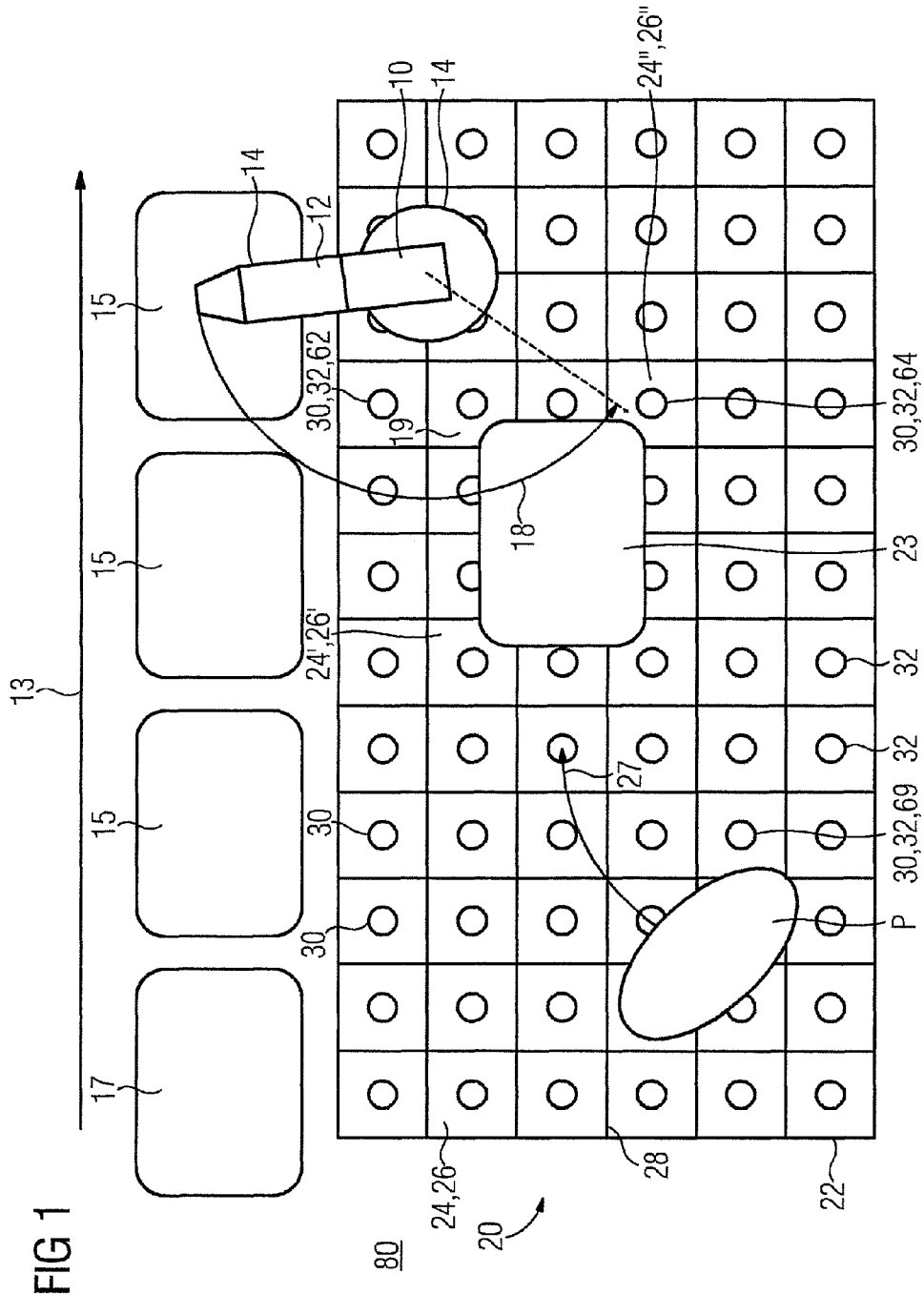
FIG. 1 is a schematic plan view of a first form of embodiment of the robot system in accordance with the invention.

FIG. 1 shows a robot system 80 with a first robot 10 having a movable manipulator, and which is arranged in a working space 20. In the region of the working space 20, a first transport item 15 and a second transport item 17 are guided along a direction of conveyance 13 to the first robot 10. The first robot 10 is formed to grip one piece each of the transport items 15, 17 using the manipulator 12, and to advance them with a pivoting movement to a deposit point 23. Here, the first robot 10 and the deposit point 23 are affixed in the working space 20. The working space 20 is subdivided into a plurality of essentially rectangular working segments 24, which border each other along dividing lines 28. The working segments 24 are essentially, but not shown in more detail, cuboidal spatial segments that are each bounded on a lower side by the floor 22 of the working space. There is a corresponding floor segment 26 belonging to each working space segment 24, where the floor segments 26 also border each other along the imaginary dividing lines 28. In addition, each of the floor segments 26 is provided with a lighting element 30, which is formed as light segments. Each of the light segments 32 is configured to output via lighting a visual warning on the surface of a floor segment 26.

FIG. 1 additionally shows a person P who is moving along a path 27 in the working space 20. In FIG. 1, shown by an arrow, is a robot's movement 18 which is to be made by the first robot 10 in a working interval 50, which is not shown in more detail. The direction of the arrow here represents the time sequence of the robot's movement. In doing this, the first robot 10 travels through a space 19 that has an essentially circular arc-shaped form. In total, the space 19 that is traveled through intersects a plurality of working space segments 24, and passes over their associated floor segments 26. Also represented in FIG. 1 is a working space segment 24' with its associated floor segment 26' which, in the course of the robot's movement 18, the first robot travels through before a second working segment 24" and its associated floor segment 26". The first floor segment 26' is passed over by the first robot 10 in a first time period 26 (not shown in FIG. 1), so that a first visual warning 62 is output on the first floor segment 26'. The second floor segment 26" is not passed over by the first robot 10 until a later second time period 54 (not shown), so that a second visual warning 64 is output on the second floor segment 26" via a lighting element 30. The working space 20 additionally has working space segments 24 that the first robot 10 does not travel through in the working interval 50. In these working space segments 24, there is no dangerous situation for the person P, so that an all-clear signal 69 is output on the associated floor segments 26. The different visual warnings 62, 64 together with the all-clear signal 69 indicate to the person P what potential danger there is in which region of the working space 20.

Figure 2:
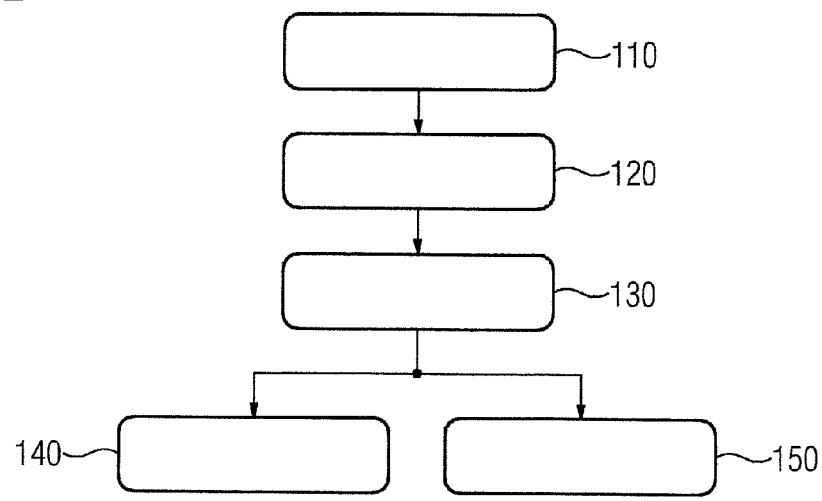
FIG. 2 is a flow diagram of an embodiment of the method in accordance with the invention.

FIG. 2 shows a schematic flow diagram of the method in accordance with the invention. In a first step 110, a prediction is made of a robot's movement 18 which is to be made by the at least one first robot 10 in a working interval 50. Here, based on the programming of the at least one first robot 10, its planned movement sequence is predicted on the assumption that no events will occur during it that lead to a standstill or a delay of the at least one first robot 10. In a further method step 120, a determination is made of which space will be traveled through by at least one first robot 20 in the working interval 50 being analyzed. In a further method step 130, a determination is made of whether a working space segment 24 resides at least partially within the space 19 traveled through. A working space segment 24 that is traveled through by at least one first robot 10 during the working interval 50 is then initially identified as a potential danger region for a person P. In addition, it is determined in the method step 130 whether a corresponding working space segment 24 is traveled through by the at least one first robot 10 in a first or second time period 52, 54. Here, a working space segment 24 that is traveled through in an earlier time period than a working space segment in a later time period is classified as more dangerous.

Depending on the result of the method step 130, either the fourth method step 140 or the fifth method step 150 occurs for a working space segment 24. If it is determined in the preceding determination step 130 that, during the first time period 52, the working space segment 24 lies at least partially in the space 19 traveled through by the robot 10, then a first visual warning 52 is output onto the associated floor segment 26. If it is determined in the preceding method step that during the second time period 54 the working space segment 24 lies at least partially in the space 19 traveled through, then a second visual warning 64 is output onto the associated floor segment 26.

Figure 3:
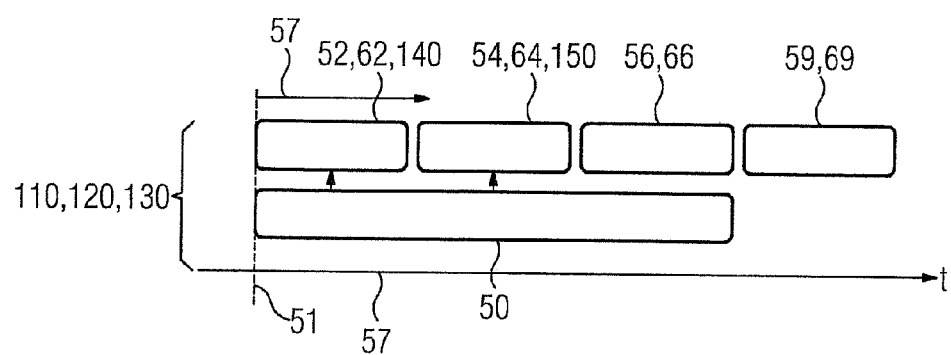
FIG. 3 is a time sequence plot of a further embodiment of the method in accordance with the invention.

From FIG. 3, the timing sequence of a further form of embodiment of the inventive method will be apparent. The starting point is the start time point 51, which defines the beginning of the working interval 50. In FIG. 3, a first time period starts, again beginning essentially at the start time point 51. If it is determined during the method steps 110, 120, 130 (not shown in more detail) that a working space segment 24 (again not shown) will be traveled through within the first time period 52 then, then as part of the fourth method step 140, a first visual warning 62 will be output on the associated floor segment 26. Following on from the first time period 52 is a second time period 54. If a working space segment 24 will be traveled through during the second time period 54 then, as part of the fifth method step 150, a second visual warning 64 is output. Here, the second time period 54 lies within the range of the working interval 50. The second time period 54 is followed by a third time period 56, which essentially also ends at the end of the working interval 50. If a working space segment 24 will be traveled through during the third time period 56, then a third visual warning 66 is output on the associated floor segment 26.

FIG. 3 further discloses an additional time period 59, which lies after the end of the working interval 50. If a working space segment 24 is not traveled through up until the beginning of the additional period 59, an all-clear signal 69 is output on the associated floor segment 26. The arrow 57 represents the time sequence, so that the working interval 50, together with the time periods 52, 54, 59, are always time periods that are to be understood as being seen relative to a start time point 51. Hence, during the operational sequences of the associated robot system 80 along the arrow 57, the time periods 52, 54, 56, 59 accompany it. The method shown in FIG. 3 is performed with continual repetition of the individual method steps 110, 120, 130, 140, and 150.

Figure 4:
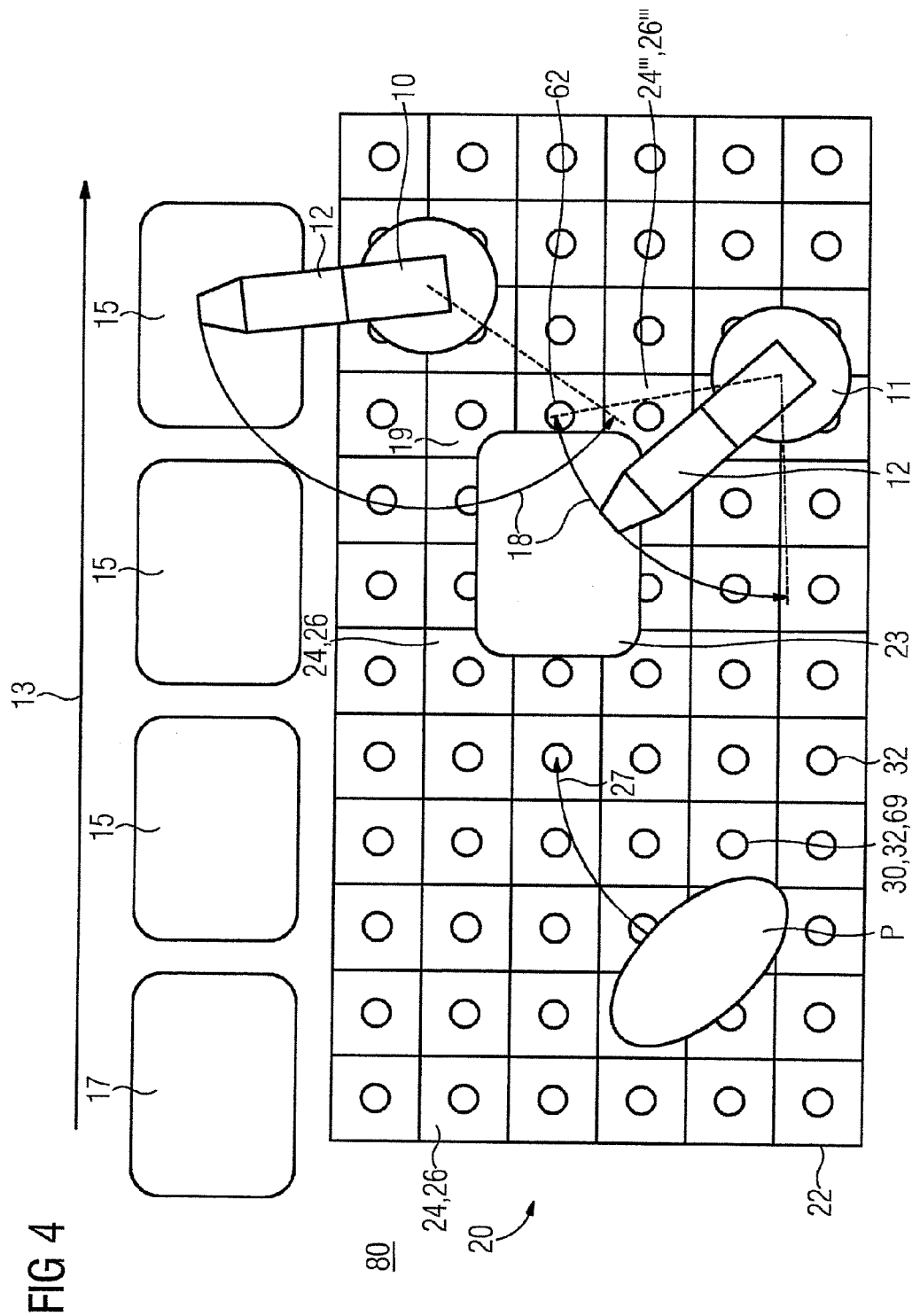
FIG. 4 is a schematic plan view of an alternative embodiment of the robot system in accordance with the invention.

FIG. 4 shows a further embodiment of the robot system 80 in accordance with the invention in the working space 20. In the region of the working space 20, a first transport item 15 and a second transport item 17 are fed along a direction of feed 13 to the first robot 10. The first robot 10 is configured for the purpose of using the manipulator 12 to grip one piece each of the transport items 15, 17, and with a pivoting movement to advance them to the deposit position 23. Here, the first robot 10 and the deposit position 23 are affixed in the working space 20. The working space 20 is subdivided into a plurality of essentially rectangular working segments 24, which border each other along dividing lines 28. Here, the working segments 24 are essentially, cuboidal-shaped spatial segments (not shown in more detailed) each of which is bounded on its lower side by the floor 22 of the working space. Belonging to each working space segment 24 is a floor segment 26, where the floor segments 26 also border each other along the imaginary dividing lines 28. Over and above this, each of the floor segments 26 is provided with a lighting element 30, which is constructed as a light segment. Each of the light segments 32 is configured to output a visual warning onto the surface of a floor segment 26 via lighting.

FIG. 4 shows, in addition, a second robot 11, which provides a manipulator 12 and performs a work step in the region of the deposit point 23. The first and second robots 10, 11 each performs movements 18 at the same time, in each of which a space 19 is traveled through. Here, the working space segments 24 lie at least partially in the space 19 traveled through, which is assigned to the robots 10, 11. The direction of the movements 18 is made clear in each case in FIG. 4 by an arrow. The direction of the arrow corresponds to the execution over time of the movement 18 concerned in the working interval 50, not shown. The working space segment 24''' in the region of the deposit point 23 is traveled through by both robots during the working interval 50. The first robot 10 travels through the working space segment 24''' at the end of its movement 18 in the second time period 54, which is again not shown. In addition, the working space segment 24''' by the second robot 11 at the start of the working interval 50, and hence in the first time period 52. On the basis of the inventive method, the robot system 80 recognizes that, in the first time period 52, there is already a potential danger in the working space segment 24''', and outputs the first visual warning 62 in the associated floor segment 26'''. Here, the first visual warning is output via the lighting element 30, which is constructed as a light segment.

For the remaining working space segments 24, which also reside at least partially in the space 19 that is traveled through, it is again determined, based on the inventive method, whether there is a potential danger in the first or second time period 52, 54, and a corresponding first or second visual warning 62, 64 is output. In the case of working space segments 24 that are not traveled through by the robots 10, 11, an all-clear signal 69 is output.

Figure 5:
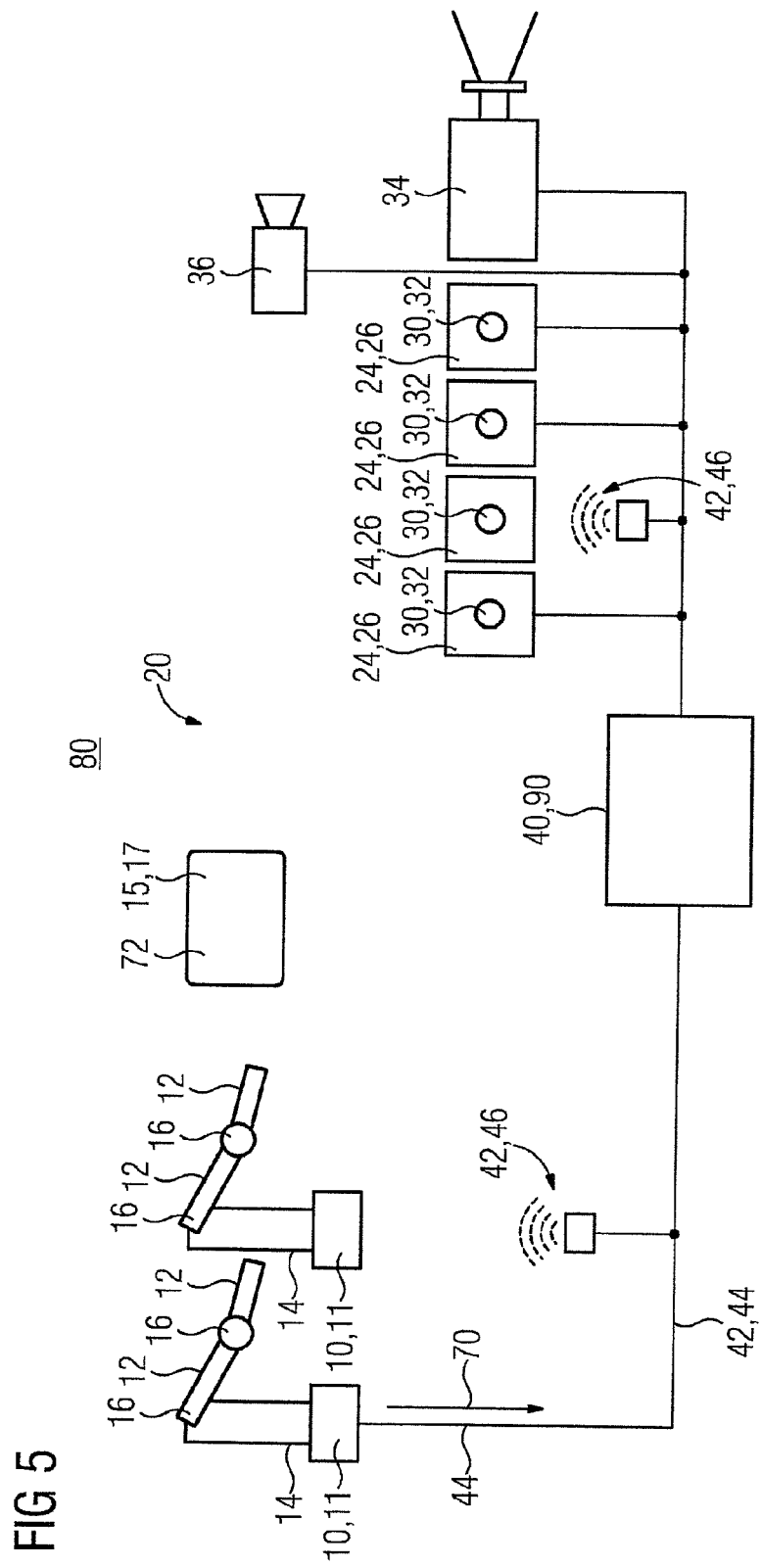
FIG. 5 is a schematic structure of a further embodiment of the robot system in accordance with the invention.

FIG. 5 schematically shows the structure of the robot system 80 in accordance with the invention, which comprises two robots 10, 11. Each of the robots 10, 11 provides a manipulator 12, which is driven by an actuator 16. The robots 10, 11 are, in addition, equipped with a sensor system 14 that permits, for example, the presence of a person to be recognized and the associated data to be passed on to the controller of the robots 10, 11. The robots 10, 11 are arranged in the working space 20 for performing working steps on the first and second transport items 15, 17. Each of the transport items 15, 17 has qualitative data 72, which can be detected by the sensor system 14 of the robots 10, 11. The robots 10, 11 are in a position to forward to a control unit 40 the qualitative data 72 that is detected, via a link 42. Apart from the qualitative data 72, other process parameters 70, such as the movement speed of a robot 10, 11, are also forwarded via the link 42 to the control unit 40. The link 42 is suitable for transporting data and is constructed as a data cable 44 between the first robot 10 and the control unit 40. The second robot 11 is coupled to the control unit 40 via a link 42 which is formed as a radio link.

Additionally, FIG. 5 shows schematically a plurality of floor segments 26, each of which is assigned to a working space segment 24, not shown in more detail. The floor segments 26 are provided with light segments 32, which serve as a lighting facility 30. An individual light segment 32 is suitable for bringing up a visual warning 62, 64, 66 or an all-clear signal 69 on at least one floor segment 26. A floor segment 26 is coupled to the control unit 40 via a radio link 46. The remaining floor segments 36 are linked to the control unit 40 via data cables 44, which serve as the link 42. The control unit 40 is, in addition, coupled via the data cable 44 to a controllable image projector 34, which is formed as a beamer, which is also in a position to output a visual warning 62, 64, 66 on the floor segments 26. Further, the controllable image projector 34 is suitable for bringing up on floor segments 26 (not shown in more detail), which have no lighting facility 30 a visual warning 62, 64, 66 or an all-clear signal 69. The controllable image projector 34 can be actuated by the control unit 40 such that, as the visual warning 62, 64, 66 or the all-clear signal 69, a constant or time-varying light pattern is output. Here, the visual warning 62, 64, 66 can take on different colors, can incorporate color transitions or can be formed as static or animated symbols. The robot system 80 is also provided with an audible warning signal emitter 36, which is linked via the data cable 44 to the controller 40 and is suitable for outputting to a person in a working space 20 an additional audible warning in situations with a heightened potential danger. The controller 40 has a processor and a memory in which is stored a computer program 90 in executable form which implements the inventive method in the robot system 80. The computer program 90 is structured such that it can process and evaluate as part of the inventive method all the data, such as process parameters 70, detected by robots 10, 11 and sent via the link 42, by data cable 44 or radio link 46. The computer program 90 is also suited to sending control signals to the individual lighting facilities 30, the controllable image projector 34, or to the audible warning signal emitter 36, where the control signals bring up the appropriate visual warnings 62, 64, 66, audible warnings 68 and the all-clear signal 69.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for providing a warning to a person about at least one first robot in a working space comprising a plurality of floor segments, a working space segment being assigned to each floor segment of the plurality of floor segments, the method comprising:
   a) predicting a robot movement which is performed by the at least one first robot in a working interval;
   b) determining a space through which the at least one first robot travels during the working interval;
   c) determining at least one working space segment which, within a first and a later second time period of the working interval, resides at least partially within the space through which the at least one first robot traveled;
   d) outputting a first visual warning onto a floor segment if the at least one first robot will travel through an associated working space segment within the first time period of the working interval; and
   e) outputting a second visual warning onto the floor segment if the at least one first robot will travel through the associated working space segment within the later second time period of the working interval.

2. The method as claimed in claim 1, wherein during step b) a space simultaneously traveled through by the at least one first robot and a first transport item is detected.

3. The method as claimed in claim 1, wherein the first and second visual warnings each comprise a colored signal or light pattern.

4. The method as claimed in claim 2, wherein the first and second visual warnings each comprise a colored signal or light pattern.

5. The method as claimed in claim 1, wherein step c) is also performed for at least one third time period and within at least one further step f) a third visual warning is output onto the floor segment if the associated working space segment is traveled through.

6. The method as claimed in claim 1, wherein during steps d) to f) an audible warning is additionally output.

7. The method as claimed in claim 1, wherein at least one of (i) visual warnings and (ii) an audible warning form a function of at least one process parameter of the at least one first robot.

8. The method as claimed in claim 6, wherein the at least one process parameter comprises at least one of (i) a movement speed of the at least one first robot and (ii) an item of qualitative data for a first or a second transport item.

9. The method as claimed in claim 5, further comprising:
outputting a visual all-clear signal in each floor segment if the at least one first robot fails to travel through the associated working space segment during the working interval.

10. The method as claimed in claim 1, wherein steps a) to c) are additionally performed for at least one second robot.

11. A robot system comprising:
a controller;
at least one first robot linked to the control unit and arranged in a working space comprising a plurality of working space segments each having an assigned floor segment; and
at least one lighting element linked to the control unit and is configured to output in each case on at least one floor segment a visual warning;
wherein the controller is configured to:
a) predict a robot movement which is performed by the at least one first robot in a working interval;
b) determine a space through which the at least one first robot travels during the working interval;
c) determine at least one working space segment which, within a first and a later second time period of the working interval, resides at least partially within the space through which the at least one first robot traveled;
d) output a first visual warning onto a floor segment if the at least one first robot will travel through an associated working space segment within the first time period of the working interval; and
e) outputting a second visual warning onto the floor segment if the at least one first robot will travel through the associated working space segment within the later second time period of the working interval.

12. The robot system as claimed in claim 11, further comprising:
at least one second robot.

13. The robot system as claimed in claim 11, wherein the at least one lighting element comprises a plurality of light segments, each of said plurality of light segments being affixed on or above an associated floor segment.

14. The robot system as claimed in claim 12, wherein the at least one lighting element comprises a plurality of light segments, each of said plurality of light segments being affixed on or above an associated floor segment.

15. The robot system as claimed in claim 12, wherein the at least one lighting element comprises a controllable image projector arranged above associated floor segments.

16. The robot system as claimed in claim 13, wherein that the at least one lighting element comprises a controllable image projector arranged above associated floor segments.

17. A non-transitory computer readable storage medium encoded with a computer program which, when executed by a processor of a controller, provides a warning to a person about at least one first robot in a working space comprising a plurality of floor segments, a working space segment being assigned to each floor segment of the plurality of floor segments, the computer program comprising:
a) program code for predicting a robot movement which is performed by the at least one first robot in a working interval;
b) program code for determining a space through which the at least one first robot travels during the working interval;
c) program code for determining at least one working space segment which, within a first and a later second time period of the working interval, resides at least partially within the space through which the at least one first robot traveled;
d) program code for outputting a first visual warning onto a floor segment if the at least one first robot will travel through an associated working space segment within the first time period of the working interval; and
e) program code for outputting a second visual warning onto the floor segment if the at least one first robot will travel through the associated working space segment within the later second time period of the working interval.

18. The non-transitory computer readable storage medium of claim 17, wherein the non-transitory computer readable storage medium comprises a memory or data carrier.

* * * * *